(12) United States Patent
Montero Pancera et al.

(10) Patent No.: US 9,011,979 B2
(45) Date of Patent: Apr. 21, 2015

(54) PROCESS FOR PRODUCING POLYMER-CONTAINING COATINGS

(75) Inventors: Sabrina Montero Pancera, Viernheim (DE); Robert Wengeler, Karlsruhe (DE)

(73) Assignee: BASF SE, Ludwigshafen (DE)

( * ) Notice: Subject to any disclaimer, the term of this patent is extended or adjusted under 35 U.S.C. 154(b) by 313 days.

(21) Appl. No.: 13/512,173

(22) PCT Filed: Nov. 26, 2010

(86) PCT No.: PCT/EP2010/068273
§ 371 (c)(1),
(2), (4) Date: May 25, 2012

(87) PCT Pub. No.: WO2011/064323
PCT Pub. Date: Jun. 3, 2011

(65) Prior Publication Data
US 2012/0263973 A1 Oct. 18, 2012

(30) Foreign Application Priority Data

Nov. 27, 2009 (EP) .................................... 09177306

(51) Int. Cl.
| | | |
|---|---|---|
| *B05D 3/02* | (2006.01) | |
| *C09D 5/16* | (2006.01) | |
| *C01F 11/18* | (2006.01) | |
| *C09D 5/14* | (2006.01) | |
| *C09D 5/36* | (2006.01) | |
| *C09D 7/12* | (2006.01) | |
| *B05D 1/02* | (2006.01) | |
| *C08K 3/26* | (2006.01) | |

(52) U.S. Cl.
CPC ........... *C09D 5/1618* (2013.01); *C01P 2004/00* (2013.01); *B05D 3/02* (2013.01); *B05D 1/02* (2013.01); *C01F 11/181* (2013.01); *C01F 11/183* (2013.01); *C01P 2004/62* (2013.01); *C08K 3/26* (2013.01); *C09D 5/14* (2013.01); *C09D 5/36* (2013.01); *C09D 7/1216* (2013.01); *C09D 7/1266* (2013.01); *C09D 7/1275* (2013.01); *C09D 7/1283* (2013.01)

(58) Field of Classification Search
None
See application file for complete search history.

(56) References Cited

U.S. PATENT DOCUMENTS

| | | | |
|---|---|---|---|
| 2,583,548 A | 1/1952 | Craig | |
| 4,242,318 A | 12/1980 | Brahm et al. | |
| 4,264,651 A * | 4/1981 | Hasson et al. | ............... 427/239 |
| 4,678,685 A * | 7/1987 | Hasson et al. | ............... 427/235 |
| 2007/0225328 A1 | 9/2007 | Fritz et al. | |
| 2007/0254141 A1 | 11/2007 | Morse et al. | |
| 2008/0085964 A1* | 4/2008 | Wakayama et al. | ........... 524/413 |
| 2008/0273206 A1 | 11/2008 | Genge et al. | |
| 2009/0022995 A1 | 1/2009 | Graham et al. | |
| 2009/0192252 A1 | 7/2009 | Stration et al. | |
| 2010/0028659 A1 | 2/2010 | Shimono et al. | |

FOREIGN PATENT DOCUMENTS

| | | |
|---|---|---|
| EP | 1835053 A1 | 9/2007 |
| EP | 1916282 A1 | 4/2008 |
| EP | 2075295 A1 | 7/2009 |

OTHER PUBLICATIONS

Podsiadlo, et al., "Layer-by-Layer Assembly of Nacre-Like Nanostructured Composites with Antimicrobial Properties", Langmuir, vol. 21, (2005), pp. 11915-11921.
International Search Report for PCT/EP2010/068273 mailed Mar. 23, 2011.
International Preliminary Report on Patentability for PCT/EP2010/068273 mailed Mar. 8, 2012.

* cited by examiner

*Primary Examiner* — Erma Cameron
(74) *Attorney, Agent, or Firm* — Drinker Biddle & Reath LLP

(57) ABSTRACT

The present invention relates to a process for producing polymer-containing coatings for surfaces by in situ precipitation of calcium carbonate. The invention is additionally directed to the polymer-containing coating as such and to surfaces to which such polymer-containing coatings have been applied. The polymer-containing coatings preferably have antibacterial action.

15 Claims, No Drawings

PROCESS FOR PRODUCING POLYMER-CONTAINING COATINGS

RELATED APPLICATIONS

This application is a national stage application (under 35 U.S.C. §371) of PCT/EP2010/068273, filed Nov. 26, 2010, which claims benefit of European Patent Application No. 09177306.9, filed Nov. 27, 2009.

The present invention relates to a process for producing polymer-containing coatings for surfaces by in situ precipitation of calcium carbonate. The invention is additionally directed to the polymer-containing coating as such and to surfaces to which such polymer-containing coatings have been applied. The polymer-containing coatings preferably have antibacterial action.

Coatings are generally understood to mean a (generally) firmly adhering layer of a substance which adapts to the shape of a surface. Coatings are important for a multitude of uses, for example in medicine, in the materials sector or else in shipping.

One of the more recent kinds of coatings is nanocoating, which refers to the application of particles in the nanometer range to surfaces, for example as spray or atomization coatings. Atomization is typically understood to mean the division of a liquid into ultrafine droplets as an aerosol (mist) in a gas (typically air). The aerosol may either consist of droplets which all have the same diameter—monodisperse spray—or include droplets of different size, in which case reference is made to a polydisperse spray. The mean droplet size induced by the atomizer is crucial for the production of a nanocoating. It is possible in principle to coat all kinds of surfaces, for example metals, glass, textiles, plastics and minerals. It is possible to use nanocoating, for example, in the sanitary sector, in implants, as an antifingerprint coating on visual display units, as a self-cleaning building façade or as paint protection for automobiles.

Since coatings usually also have to fulfill the task of protecting a surface from attack by bacteria, fungi or algae, and hence the destruction of the surface is to be prevented, there is a rising demand for coatings with fungicidal, antibacterial, algicidal or antimicrobial action.

Podsiadlo et al. (Langmuir 2005, 21(25), 11915-11921) describe the production of a layer-by-layer structure of mother-of-pearl-like nanostructured materials with antimicrobial properties. The coating comprises polymeric components such as polydiallyl-dimethylammonium chloride, polyacrylic acid, modified sodium montmorillonite and sodium Cloisite as assistants. The coating is produced by means of a repeated dipping process. The antibacterial effect of the coating is brought about by the addition of silver nanoparticles.

US 2007/0254141 describes thin coatings with nanostructure. The synthesis is performed by means of a concerted vapor diffusion/sol-gel method, which takes place spontaneously at room temperature and gives rise to an ordered semiconductor material such as barium titanate with high purity without use of organic, biological or biochemical templates. The materials obtained are semiconductor, photoconductor, photoelectric, electrooptical or battery materials. The synthesis strategy is based on a biologically inspired low-temperature method which conducts the hydrolytic catalysis of molecular precursors in close connection with the growth of the semiconductor material. By varying the temperature, different nanoparticle sizes and structures can be obtained.

US 2008/0273206 describes a process for biomimetic mineralization of calcium phosphate. In the process, the formation of a synthetic mineralization complex is explained, i.e. calcium phosphate mineral deposition is obtained in situ, and studies are described with regard to the growth thereof and kinetics thereof. The findings obtained are intended to serve as support for the production of medicaments to counteract osteoarthritis and/or atherosclerosis.

EP-A 1835053 describes a process for producing environmentally compatible biominerals such as mother-of-pearl, which possess an organized crystal structure. In the production process by means of a membrane dipping process, biogenic calcium carbonate in crystalline form is generated in vitro on an organic matrix with the aid of a specific crystallization membrane.

A disadvantage of the processes to date is that they are not usable for a large-area coating since coating processes are typically performed as dipping processes. In addition, they require complex apparatus or additional energy for lowering the temperature or increasing the temperature, and a considerable time investment. Furthermore, antibacterial coatings which are produced according to the prior art usually additionally comprise silver or other heavy metals which pollute the environment or are even toxic.

It is therefore an object of the invention to provide a process with which the permanent coating of surfaces is enabled on the industrial and large-area scale within minimum time and at minimum cost, and the polymer-containing coating produced should preferably be antibacterial.

The object is achieved by a process for producing polymer-containing coatings for surfaces, which comprises applying at least one polymer and crystalline calcium carbonate formed by in situ precipitation to a surface, using at least one calcium ion source and at least one carbonate ion source as reactants for the crystalline calcium carbonate.

The process according to the invention preferably produces antibacterial polymer-containing coatings. Specifically, the coating is an antibacterial, polymer-containing coating with bactericidal action. An antibacterial agent (coating) is understood by the person skilled in the art to mean an agent which at least partially or completely kills or eliminates the bacteria, or prevents the growth and the multiplication of the bacteria. An agent with bactericidal action is understood by the person skilled in the art to mean an agent which kills bacteria.

According to the invention, the reactants used for the crystalline calcium carbonate are at least one calcium ion source and at least one carbonate ion source. Preference is given to using one calcium ion source and one carbonate ion source. Reaction of the calcium ions present in the calcium ion source with the carbonate ions present in the carbonate ion source forms calcium carbonate. In order to enable in situ precipitation of crystalline calcium carbonate, the calcium ion source and the carbonate ion source, in accordance with the invention, are at first provided spatially separately from one another. The calcium ion source and the carbonate ion source are combined by methods known to those skilled in the art for in situ precipitation of crystalline calcium carbonate. The in situ precipitation is preferably effected directly on the surface (to be coated) or in the immediate proximity of the surface, for example at a distance of not more than 1 meter.

More preferably, the in situ precipitation is effected at a distance of less than 20 cm from the surface. For this purpose, the calcium ion source and the carbonate ion source are subjected spatially separately from one another, but simultaneously, to a spraying process, especially to an atomization process. Collision and coalescence of the reactant droplets produced, for example, in a spraying process can thus form crystalline calcium carbonate by in situ precipitation. The collision may occur directly on the surface to be coated or else in the space between surface and atomizer, in which case the crystalline calcium carbonate formed (precipitated) in situ is deposited on the surface. Particular preference is given to the in situ precipitation of the crystalline calcium carbonate directly on the surface.

However, in situ precipitation within the process according to the invention is not understood to mean a precipitation process which comprises a dipping process or a membrane process.

The calcium ion sources used may be calcium salts, such as calcium chloride, calcium fluoride, calcium bromide, calcium iodide, calcium sulfate, calcium sulfide, calcium hydroxide, especially preferably calcium chloride. It is optionally also possible to use other calcium ion sources known to those skilled in the art.

The carbonate ion sources used may be alkali metal carbonates such as lithium carbonate, sodium carbonate, sodium hydrogencarbonate, potassium carbonate, rubidium carbonate and cesium carbonate, preference being given especially to the use of sodium carbonate. It is of course also possible to use other carbonate ion sources known to those skilled in the art.

The concentration of calcium ions in the particular calcium ion source may be 0.01 to 4.0 mol/L. The concentration of calcium ions in the particular calcium ion source is preferably 0.1 to 1.0 mol/L.

The concentration of carbonate ions in the particular carbonate ion source may be 0.01 to 4.0 mol/L. The concentration of carbonate ions in the particular carbonate ion source is preferably 0.1 to 1.0 mol/L.

The calcium ion source and/or the carbonate ion source preferably each independently comprise at least one solvent. This solvent is preferably water or an alcohol, more preferably water.

According to the invention, at least one polymer is applied to the surface to be coated, preference being given to using one polymer. The polymer is applied by the methods known to those skilled in the art, for example by a spraying process, especially an atomization process. The polymer can be applied to the surface spatially separately and/or at a different time or together with the calcium carbonate formed by in situ precipitation. Preference is given to performing the application of polymer and calcium carbonate precipitated in situ together. For example, the polymer can be partly or fully combined, for example mixed, with the calcium ion source and/or the carbonate ion source before the application. Optionally, the polymer can, however, also be provided partly or completely in spatial separation from the calcium ion source and/or the carbonate ion source.

The polymers used may in principle be all polymers known to those skilled in the art. Preference is given to using polymers selected from the group consisting of polyglycidols, polyglycidol derivatives, polyglycerols, polyglycerol derivatives, linear or modified polyacrylic acids, copolymers of maleic acid and acrylic acid, polyalkylamines, polyalkenylamines, quarternary ammonium polymers, hyperbranched polyesters and block copolymers.

The block copolymers used are the block copolymers which control calcium carbonate formation, for example PEO-b-PMAA (poly(ethylene oxide)-block-poly(methacrylic acid)). In addition, it is also possible to use proteins which control calcium carbonate formation, such as lustrin, perlucin, ovocleidin or ansocalcin.

The calcium carbonate precipitated in situ by the process according to the invention preferably has a crystal size of less than 10 μm, especially of less than 1 μm. Especially when the solution is atomized with the calcium ion source and/or the carbonate ion source by a spraying process on a surface, crystal sizes of less than 1 μm can be obtained. Thus, the production of a nanocoating is also possible.

In the process according to the invention, the ratio of calcium ions to carbonate ions may be 10:1 to 1:10 and the ratio of calcium ions and carbonate ions to polymer may be 1:1 to 100:1. In a particularly preferred embodiment of the invention, the ratio of calcium ions to carbonate ions to polymer is 10:10:1. The ratio between polymer and calcium carbonate precipitated in situ can control the properties of the inventive polymer-containing coating on the surface. This preferably forms polymer-containing coatings which comprise calcium carbonate precipitated in situ which has an aragonite structure.

Through the use of different polymers, through the selection of the ratio between polymer and through calcium carbonate formed by in situ precipitation, it is advantageously possible in the process according to the invention to directly control the crystal morphology of the resulting crystalline calcium carbonate in the preferably antibacterial, polymer-containing coating. Thus, crystal growth can be directed within spatially restricted areas. The polymer influences or limits crystal growth here. According to how the crystal morphology of the polymer-containing coating is selected, the polymer-containing coating can be matched to different surfaces and to different end uses. For instance, optimal adjustment to different fields of use is possible, for example in medicine or in the materials sector, exterior or interior sector, but also controlled production of a nanocoating. The inventive, preferably antibacterial, polymer-containing coating can especially be used for the coating of ships' hulls.

In the coating process according to the invention, a coating comprising at least one polymer and crystalline calcium carbonate is provided on a surface.

The thickness of the inventive, preferably antibacterial, polymer-containing coatings may be between 0.1 and 100 μm according to the field of use.

In a particularly preferred embodiment of the process according to the invention, at least one polymer and crystalline calcium carbonate formed by in situ precipitation are applied to a surface by spraying on the reactants and/or the polymer, using, as reactants for the crystalline calcium carbonate, at least one calcium ion source and at least one carbonate ion source.

When a polymer-containing coating is applied by spraying the reactants onto a surface, application of the coating process according to the invention on the industrial and large-area scale is particularly advantageous because this makes possible a further reduction in the time investment and costs.

In the process according to the invention for producing a preferably antibacterial, polymer-containing coating, it is additionally also possible to use adhesion promoters. Examples of adhesion promoters are known to those skilled in the art.

In one embodiment, the coating process according to the invention may additionally further comprise at least one of the following steps:
  a) atomization of at least one polymer, of at least one calcium ion source and/or of at least one carbonate ion source, at least one polymer optionally being present in at least one calcium ion source and/or in at least one carbonate ion source;
  b) optionally applying an adhesion promoter to the surface or
  c) drying the polymer-containing coating,
  steps a) to c) optionally proceeding cyclically and/or the sequence of steps a) and b) being switchable.

The calcium ion source and/or the carbonate ion source can preferably be applied simultaneously or successively from a solution by atomizing.

For example, the production of a preferably antibacterial, polymer-containing coating can be performed using an atomizer. The atomizers used may, for example, be one-substance pressure atomizers, two-substance atomizers (in which case the atomization is effected with a pressurized gas, such as air or nitrogen) or specific ultrasound or electrostatic atomizers.

The atomization can also be effected by means of two or more separate atomizers, or by means of a design which enables the atomization of two liquids with a single atomizer (for example a three-substance nozzle with motive air). Preference is given to using pressure atomizers or three-substance nozzles.

The atomization temperature may be between 20° C. and 200° C. Preference is given to temperatures between 20° C. and the boiling point of the solvent used.

Any operation to dry the polymer-containing coating which concludes the process is preferably performed at temperatures between 20 and 200° C. Particular preference is given to drying processes which can be performed at low temperatures.

The process according to the invention can give a polymer-containing coating with a mother-of-pearl and/or lotus effect. This property can have the effect that an iridescently shiny, flat polymer-containing coating and/or a water- and soil-repellent polymer-containing coating can be obtained.

The inventive polymer-containing coating is likewise notable for a high scratch resistance. A particularly high scratch resistance of the polymer-containing coating can be achieved when the coating process is effected by means of a spraying process.

The process according to the invention gives, in one embodiment, a multilayer, at least two-layer, polymer-containing coating which has a repeating organized structure, with the structure and/or morphology of the coating not changing over the height, but remaining the same or at least appearing (very) similar in the individual layers. In this way, by means of a single, cyclic process, a very durable, long-life and stable polymer-containing coating can be produced. In this case, reference is also made to a "semipermanent coating" or a "self-renewable coating". This embodiment is preferably performed as a spraying process.

In a further embodiment of the invention, it is also possible to add further active ingredients, such as antimicrobial substances. Examples thereof may be silver or tin compounds, but also active antimicrobial substances from the class of the fungicides, algicides, herbicides, bactericides or virostatics.

In the process according to the invention, it is additionally possible also to use further additives or effect substances. Examples thereof may be substances selected from the group of the dyes or pigments, fluorescence substances, colloidal substances, plasticizers, stabilizers or UV stabilizers.

The present invention further provides a polymer-containing coating which is producible by the process according to the invention.

The present invention further provides a surface to which a polymer-containing coating producible by the process according to the invention can be applied.

The present invention further provides the polymer-containing coating producible by the process according to the invention, and/or surfaces which have been coated with a polymer-containing coating producible by the process according to the invention and may have antibacterial action.

According to the invention, it is possible in principle to provide all surfaces, for example metals, glass, textiles, plastics and minerals, with the inventive, calcium carbonate-based, preferably antibacterial, polymer-containing coating.

The preferably antibacterial, polymer-containing coatings produced in accordance with the invention may find use, for example, as a coating of ships' hulls, coatings of underwater measuring instruments, submersible probes and capsules, buoys, oil drilling platforms, coating for wind turbines, transmitter masts, garden furniture, as paint for building facades, coatings of articles in the sanitary sector, implants or medical measuring and storage articles.

EXAMPLES

Example 1

A peristaltic pump (Ismatec) with a pump head for two tubing lines is used to charge a Schlick three-substance nozzle with two different solutions. The nozzle is mounted at a distance of 10 cm from the vertical slide (glass).

The general production coating comprises three process steps:
1. Spray coating: spraying of the slide (glass microscope slide) with two reactant solutions, which reacted to give $CaCO_3$ directly on the surface of the slide.
2. Washing in double-distilled water to remove sodium and chloride ions present, and unabsorbed chemicals.
3. Drying (at room temperature with air) or heat treatment (at 120-300° C.): air flows out of the compressed air supply network onto the slide; the heat treatment is effected in a drying cabinet.

For the production of the coating, steps 1-2 or 1-3 are repeated several times. Coating times (step 1) are varied within the range of 5 s-60 min, with the focus on times between 5 s and 60 s.

For the production of the hybrid thin layers, calcium and carbonate ions are initially charged separately from one another. The following reactant solutions are used:

Solution 1: Aqueous $Na_2CO_3$ solution containing polyacrylic acid (Sokalan PA 30, $M_W$=8000 g/mol), Solution 2: Aqueous $CaCl_2$ solution containing polyethylenimine (PEI) (Lupasol WF; $M_W$=25 000 g/mol.

The concentrations of $Ca^{2+}$ and $CO_3^{2-}$ are varied within the range of 0.01-1 Mol/L, and abrasion stability is attained at concentrations of 0.1 Mol/L. The ratio of the $Ca^{2+}:CO_3^{2-}$:$COO^-$ ions is selected at 10:10:1 and 10:10:10. For the polyethylenimine (PEI), a concentration of 20 g/L is selected.

Fingernail Test

The surface coatings are tested for abrasion resistance and remain stable even in water and salt.

Example 2

The procedure is analogous to Example 1.
1. Spray coating: Spraying time 5 s. Solution 1:0.1 Mol/L $Na_2CO_3$+0.1 Mol/L $COO^-$. Solution 2: 0.1 Mol/L $CaCl_2$+20 g/L PEI.
2. Washing: 30 s in water.

Repetition of 1. and 2. twice. Blow drying for 300 s. Repetition of 1. and 2. Blow drying for 300 s.

The coating is subjected to SEM imaging and atomic force microscopy analyses for evaluation. These show roughnesses (measurements on three different samples—a) to c)—intermittent contact mode, 8 μm×8 μm, determination of root mean square roughness Rq and waviness Wq)

a) Rq=13 nm±1 nm Wq=83 nm±13 nm
b) Rq=9 nm±1 nm Wq=64 nm±10 nm c) Rq=16 nm±1 nm Wq=61 nm±4 nm and crystal sizes (detail scan 1 µm×1 µm):
d_average sample 1=190 nm±10 nm
d_average sample 2=150 nm±12 nm.

In some edge regions, very many relatively fine crystals with a very narrow distribution of particle size are found (e.g. d_p=67 nm±3 nm), which have self-organized. The film thickness is determined to be h=3.43±0.09 µm.

Example 3

The performance is analogous to Example 1.
1. Spray coating: Spray time 5 s. Solution 1:0.1 Mol/L $Na_2CO_3$+0.1 Mol/L $COO^-$. Solution 2: 0.1 Mol/L $CaCl_2$+20 g/L PEI.
2. Washing: 30 s in water.
3. Drying at ambient temperature in an air stream (300 s). Repetition of steps 1 to 3 five times.

The coating is subjected to SEM imaging and scanning microscopy analyses for evaluation. These show roughnesses (measurements on three different samples—a) to c)—intermittent contact mode, 8 µm×8 µm, determination of root mean square roughness Rq and waviness Wq)
a) Rq=26 nm±2 nm Wq=11 nm±17 nm
b) Rq=17 nm±3 nm Wq=107 nm±20 nm
c) Rq=11 nm±1 nm Wq=75 nm±13 nm and crystal sizes (detail scan 1 µm×1 µm):
d_average sample 1=185 nm±11 nm
d_average sample 2=152 nm±9 nm.

In some edge regions, very many relatively fine crystals with a very narrow distribution of particle size are found (e.g. d_p=48 nm±1 nm), which have self-organized. The film thickness is determined to be h=4.98±0.17 µm.

Example 4

The performance is analogous to Example 1.
1. Spray coating: Spray time 5 s. Solution 1:0.1 Mol/L $Na_2CO_3$+0.1 Mol/L $COO^-$. Solution 2: 0.1 Mol/L $CaCl_2$+20 g/L PEI.
2. Washing: 30 s in water.
3. Drying at ambient temperature in an air stream (300 s). Repetition of steps 1 to 3 once.

The coating is subjected to SEM imaging and scanning microscopy analyses for evaluation. These show roughnesses (measurements on three different samples—a) to c)—intermittent contact mode, 8 µm×8 µm, determination of root mean square roughness Rq and waviness Wq)
a) Rq=18 nm±1 nm Wq=62 nm±10 nm
b) Rq=22 nm±1 nm Wq=68 nm±7 nm
c) Rq=23 nm±4 nm Wq=108 nm±17 nm
and crystal sizes (detail scan 1 µm×1 µm):
d_average sample 1=153 nm±9 nm In some edge regions, very many relatively fine crystals with a very narrow distribution of particle size are found (e.g. d_p=58 nm±3 nm). The film thickness is determined to be h=1.55±0.15 µm.

The examples show that a scratch-resistant and flat coating is possible by means of the spraying process according to the invention. The analyses show that nanoscale $Ca_2CO_3$ crystals are obtained by means of the process described and they had been embedded into a polymer matrix.

The invention claimed is:

1. A process for producing a polymer-containing coating for surfaces, which comprises applying at least one polymer and crystalline calcium carbonate formed by in situ precipitation to a surface, using at least one calcium ion source and at least one carbonate ion source as reactants for the crystalline calcium carbonate, wherein the in situ precipitation is effected directly on the surface or at a distance of not more than 1 meter.

2. The process according to claim 1, wherein the at least one calcium ion source or the at least one carbonate ion source comprise at least one solvent.

3. The process according to claim 2, wherein the solvent is water or an alcohol.

4. The process according to claim 1, wherein the crystalline calcium carbonate precipitated in situ has a crystal size of less than 10 µm.

5. The process according to claim 4, wherein the crystal size is less than 1 µm.

6. The process according to claim 1, wherein the polymer-containing coating has antibacterial action.

7. The process according to claim 1, wherein at least one polymer is selected from the group consisting of polyglycidols, polyglycidol derivatives, polyglycerols, polyglycerol derivatives, linear or modified polyacrylic acids, copolymers of maleic acid and acrylic acid, polyalkylamines, polyalkenylamines, quarternary ammonium polymers, hyperbranched polyesters and block copolymers.

8. The process according to claim 1, wherein the concentration of calcium ions in the calcium ion source is 0.01 to 4.0 mol/L or the concentration of carbonate ions in the carbonate ion source is 0.01 to 4.0 mol/L.

9. The process according to claim 1, wherein the in situ precipitation of the crystalline calcium carbonate is effected directly on the surface.

10. The process according to claim 1, wherein the ratio of calcium ions to carbonate ions in the polymer-containing coating of the surface is 10:1 to 1:10, and the ratio of calcium ions and carbonate ions to polymer is 1:1 to 1:100.

11. The process according to claim 1, wherein the calcium ion source and the carbonate ion source are subjected spatially separated from one another, but simultaneously, to a spraying process, and the in situ precipitation is effected at a distance of less than 20 cm from the surface.

12. The process according to claim 1, wherein the process additionally comprises at least one of the following steps:
a) atomization of at least one polymer, of at least one calcium ion source or of at least one carbonate ion source, at least one polymer optionally being present in at least one calcium ion source or in at least one carbonate ion source;
b) optionally applying an adhesion promoter to the surface or
c) drying the polymer-containing coating,
steps a) to c) optionally proceeding cyclically or the sequence of steps a) and b) being switchable.

13. The process according to claim 1 for production of a polymer-containing coating for surfaces selected from the group consisting of metals, glass, textiles, polymers and minerals.

14. The process according to claim 1, wherein the polymer-containing coating has a mother-of-pearl or lotus effect.

15. The process according to claim 1, wherein antimicrobial substances are optionally added to the polymer-containing coating.

* * * * *